(12) United States Patent
Birjandi et al.

(10) Patent No.: US 8,055,369 B2
(45) Date of Patent: Nov. 8, 2011

(54) OPTIMIZED DEPLOYMENT OF PARTS IN A DISTRIBUTION NETWORK

(75) Inventors: Rosa H. Birjandi, Newton, MA (US); Omer Bakkalbasi, Mahopac, NY (US)

(73) Assignee: JDA Software Group, Inc., Scottsdale, AZ (US)

( * ) Notice: Subject to any disclaimer, the term of this patent is extended or adjusted under 35 U.S.C. 154(b) by 0 days.

(21) Appl. No.: 12/684,856

(22) Filed: Jan. 8, 2010

(65) Prior Publication Data

US 2010/0114669 A1       May 6, 2010

Related U.S. Application Data

(63) Continuation of application No. 11/876,210, filed on Oct. 22, 2007, now Pat. No. 7,672,867, which is a continuation of application No. 10/032,971, filed on Oct. 25, 2001, now Pat. No. 7,337,031.

(60) Provisional application No. 60/243,659, filed on Oct. 26, 2000.

(51) Int. Cl.
*G06F 19/00* (2006.01)

(52) U.S. Cl. ........ 700/106; 700/115; 235/376; 705/7.31

(58) Field of Classification Search .................. 235/376, 235/385, 383; 705/8–10, 7.11, 7.12, 7.22, 705/7.23, 7.25, 7.27, 7.31; 700/99, 106, 700/115, 117

See application file for complete search history.

(56) References Cited

U.S. PATENT DOCUMENTS

| | | | |
|---|---|---|---|
| 5,265,006 A | 11/1993 | Asthana et al. | |
| 5,445,317 A | 8/1995 | Sokolowski | |
| 5,596,493 A | 1/1997 | Tone et al. | |
| 5,611,051 A | 3/1997 | Pirelli | |
| 5,630,070 A | 5/1997 | Dietrich et al. | |
| 5,819,232 A * | 10/1998 | Shipman | 705/8 |
| 5,953,707 A | 9/1999 | Huang et al. | |
| 5,963,919 A | 10/1999 | Brinkley et al. | |
| 5,970,465 A | 10/1999 | Dietrich et al. | |
| 5,971,585 A | 10/1999 | Dangat et al. | |
| 5,974,395 A | 10/1999 | Bellini et al. | |
| 5,983,194 A | 11/1999 | Hogge et al. | |
| 6,006,196 A | 12/1999 | Feigin et al. | |
| 6,061,691 A | 5/2000 | Fox | |
| 6,078,900 A * | 6/2000 | Ettl et al. | 705/28 |
| 6,094,603 A | 7/2000 | Ishii | |
| 6,151,582 A | 11/2000 | Huang et al. | |
| 6,205,431 B1 | 3/2001 | Willemain et al. | |
| 6,341,266 B1 * | 1/2002 | Braun | 705/7 |
| 6,486,899 B1 | 11/2002 | Bush, Jr. | |
| 6,493,679 B1 | 12/2002 | Rappaport et al. | |
| 6,516,301 B1 | 2/2003 | Aykin | |
| 6,609,108 B1 * | 8/2003 | Pulliam et al. | 705/26.5 |

(Continued)

*Primary Examiner* — Andrew Joseph Rudy

(74) *Attorney, Agent, or Firm* — Booth Udall, PLC; Steven J. Laureanti

(57) ABSTRACT

A method for deploying parts is disclosed. Locations that include supply locations and demand locations are defined. A supply location supplies parts to a demand location. A demand is computed for each part at each location. An availability lead-time is estimated for each part at each location. A lead-time demand is computed for each part at each location using the availability lead-times for the part. A stock level is computed for each part at each location. A completely filled demand is determined from the lead-time demands and the stock levels, and a partially filled demand is determined from the lead-time demands and the stock levels. A coverage function for the parts at the locations is generated from the completely filled demand and the partially filled demand.

24 Claims, 4 Drawing Sheets

U.S. PATENT DOCUMENTS

| | | |
|---|---|---|
| 6,611,755 B1 * | 8/2003 | Coffee et al. ................. 701/213 |
| 6,684,180 B2 | 1/2004 | Edwards et al. |
| 6,725,204 B1 | 4/2004 | Gusley |
| 6,816,839 B1 | 11/2004 | Gung et al. |
| 6,954,734 B1 | 10/2005 | Kuelbs et al. |
| 7,003,474 B2 | 2/2006 | Lidow |
| 7,130,807 B1 | 10/2006 | Mikurak |
| 7,210,624 B1 | 5/2007 | Birjandi et al. |
| 7,337,031 B1 * | 2/2008 | Birjandi et al. ................. 700/99 |
| 7,363,249 B1 | 4/2008 | Boesjes |
| 7,519,444 B2 * | 4/2009 | Lilly et al. .................... 700/100 |
| 7,672,867 B2 * | 3/2010 | Birjandi et al. .............. 705/7.31 |

* cited by examiner

OPTIMIZED DEPLOYMENT OF PARTS IN A DISTRIBUTION NETWORK

CLAIM OF PRIORITY

This application is a continuation of U.S. patent application Ser. No. 11/876,210, filed on 22 Oct. 2007 and entitled "OPTIMIZED DEPLOYMENT OF PARTS IN A DISTRIBUTION NETWORK", which is a continuation of U.S. patent application Ser. No. 10/032,971, filed on 25 Oct. 2001 and entitled "OPTIMIZED DEPLOYMENT OF PARTS IN A DISTRIBUTION NETWORK", now U.S. Pat. No. 7,337,031, and which claims the benefit under 35 U.S.C. §119(e) of U.S. Provisional Application Ser. No. 60/243,659, filed 26 Oct. 2000 and entitled "SYSTEM AND METHOD FOR OPTIMIZED DEPLOYMENT OF INVENTORY, OR REDISTRIBUTION OF EXISTING INVENTORY, ACROSS A MULTI-ECHELON DISTRIBUTION NETWORK" and which is related to U.S. patent application Ser. No. 10/033,103, filed 25 Oct. 2001 and entitled "REDISTRIBUTION OF PARTS IN A DISTRIBUTION NETWORK."

U.S. patent application Ser. No. 11/876,210, U.S. patent application Ser. No. 10/033,103, U.S. Pat. No. 7,337,031, and U.S. Provisional Application Ser. No. 60/243,659 are commonly assigned to the assignee of the present application. The disclosure of related U.S. patent application Ser. No. 11/876,210, U.S. patent application Ser. No. 10/033,103, U.S. Pat. No. 7,337,031, and U.S. Provisional Application Ser. No. 60/243,659 are hereby incorporated by reference into the present disclosure as if fully set forth herein.

BACKGROUND

1. Technical Field of the Invention

This invention relates generally to the field of inventory distribution networks and more specifically to optimized deployment of parts in a distribution network.

2. Background of the Invention

Distribution networks may include one or more locations that receive parts from a vendor and distribute the parts within the distribution network in order to provide a customer with a product. The parts may be, for example, manufactured into a product within the distribution network. Distribution networks may include locations that both supply parts to and receive parts from other locations. Performance at each location is thus affected by the performance at its suppliers. As a result, maintaining an optimal inventory of parts at each location that best serves the customer while minimizing inventory costs poses a challenge for inventory managers.

SUMMARY OF THE INVENTION

In accordance with the present invention, disadvantages and problems associated with inventory deployment and redistribution techniques are reduced or eliminated.

According to one example of the present invention, a method for deploying parts is disclosed. Locations that include supply locations and demand locations are defined. A supply location supplies parts to a demand location. A demand is computed for each part at each location. An availability lead-time is estimated for each part at each location. A lead-time demand is computed for each part at each location using the availability lead-times for the part. A stock level is computed for each part at each location. A completely filled demand is determined from the lead-time demands and the stock levels, and a partially filled demand is determined from the lead-time demands and the stock levels. A coverage function for the parts at the locations is generated from the completely filled demand and the partially filled demand.

Certain examples of the invention may provide one or more technical advantages. The present invention may be used to determine an optimized inventory deployment plan that describes the inventory at each location of a distribution network. The inventory deployment plan may optimize the ability of the distribution network to satisfy customer demand while conforming to business constraints. The inventory deployment plan may maximize the ability of the distribution network to fill orders, which may be calculated by minimizing the expected backorder of the distribution network. The present invention may be used to formulate a coverage function that is optimized to determine an optimized inventory deployment plan. Coverage may be used as a measure of customer service that describes the expected ability of each location to completely or partially fill a demand for a part. The present invention may be used to compute the expected number of partially and completely backordered demand for a part.

The present invention may be used to calculate a net demand for a part at a location that accounts for dependent demands and independent demands. A dependent demand at a location describes the parts that the location supplies to other locations in the distribution network, and an independent demand at a location describes the parts used at the location. Incorporating the independent and dependent demand into the demand may provide for a more accurate calculation of the demand. The present invention may be used to calculate a demand for a part at a location that takes into account the probability that the part is repaired and placed back into the inventory at the location. By taking into account the repaired parts, the calculation of the demand may be more accurate.

The present invention may be used to calculate the availability lead-time for a part at any number of supply locations. The demand location may order a certain proportion of parts from the supply locations in a particular order. The computation of the availability lead-time takes into account the probability that a supply location supplies the part, given that no other supply location has supplied the part, which may provide a more realistic calculation of availability lead-time. The replenishment lead-time at a demand end point may be computed as the availability lead-time at its supplier plus the transfer lead-time from the supplier to the demand end point.

The present invention may be used to calculate the expected number of backordered demand for a part at a location from the partially backordered and completely backordered demand. An equivalence relation between maximizing the coverage function and minimizing the sum of backorders may be determined.

Other technical advantages may be readily apparent to one skilled in the art from the figures, descriptions and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
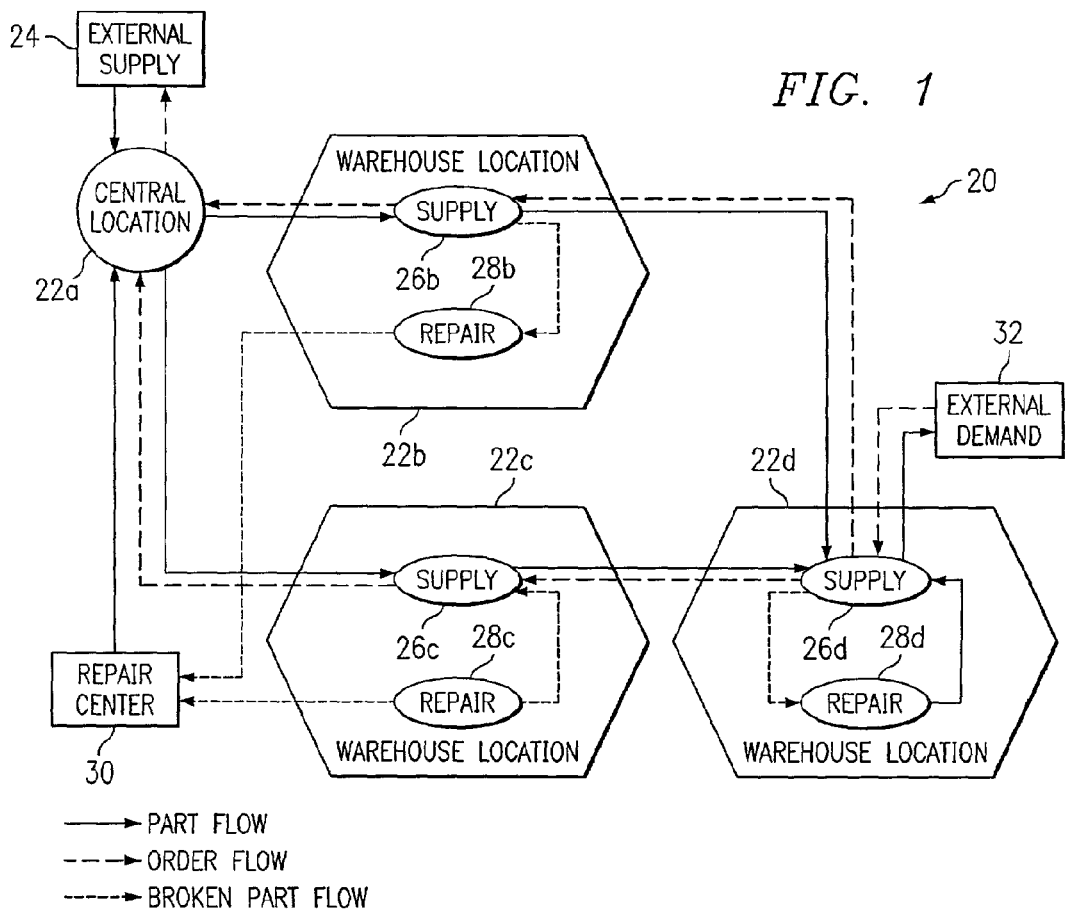
FIG. 1 illustrates an example distribution network for deploying and redistributing inventory of one or more parts among one or more locations.

FIG. 1 illustrates an example distribution network 20 for deploying and redistributing inventory of one or more parts among one or more locations 22. Distribution network 20 includes locations 22 that distribute parts throughout distribution network 20. A part may comprise, for example, a product, a portion of a product, a device used to manufacture a product, or any other suitable item that may be distributed from one location 22 to another location 22 in distribution network 20.

In one embodiment, locations 22 include a central location 22a and one or more warehouse locations 22b-d. Although central location 22a and warehouse locations 22b-d are illustrated, distribution network 20 may include any suitable number of central locations 22 and warehouse locations 22. Each location 22 may comprise a supply location and/or a demand location. A supply location supplies a part to a demand location, and may supply the part in response to an order for the part sent from the demand location. For example, warehouse location 22b supplies parts to warehouse location 22d, and warehouse locations 22b-c supply parts to location 22d. A location 22 may comprise both a demand location and a supply location. For example, warehouse location 22b receives parts from central location 22a and supplies parts to warehouse location 22d. A supply endpoint such as central location 22a receives parts from one or more external supplies 24, for example, a vendor, and distributes the parts to warehouse locations 22b-d. A demand endpoint such as warehouse location 22d provides parts to one or more external demands 32, for example, a customer.

Warehouse locations 22b-d may include supply operations 26b-d and/or repair operations 28b-d. A supply operation 26 sends an order for a part to a supply location, which in response sends the part to supply operation 26. A repair operation 28 may receive a broken part from supply operation 26 and send the broken part to a repair center 30. Repair center 30 repairs the part and sends the repaired part to, for example, central location 22a or back to supply operation 26b. Alternatively, repair operation 28d may receive a broken part from supply operation 26d, repair the part, and send the repaired part back to supply operation 26d.

The inventory for each part at each location 22 is monitored, continuously or periodically. In response to the inventory falling below a predetermined level, an order is placed to bring the inventory position back up to a target level such as an optimized inventory level. A method for deploying and redistributing inventory of one or more parts among one or more locations to achieve optimized inventory levels is described in more detail with reference to FIG. 2.

Figure 2:
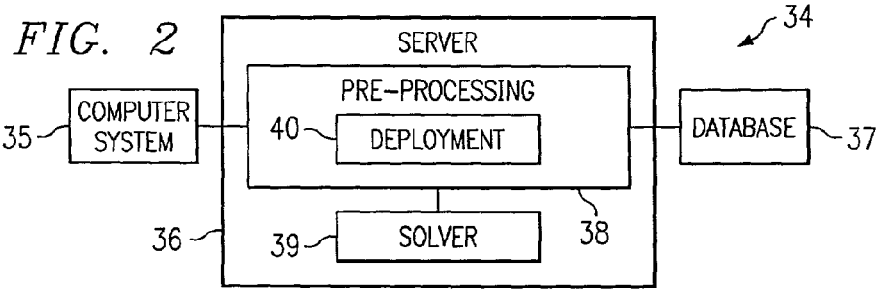
FIG. 2 illustrates an example system that generates optimized inventory deployment and redistribution plans.

FIG. 2 illustrates an example system 34 that generates optimized inventory deployment and redistribution plans. An inventory deployment plan describes a distribution of parts among locations 22 of distribution network 20, and an inventory redistribution plan describes a manner of redistributing parts to satisfy an inventory deployment plan. Deployment may occur independently of redistribution. That is, inventory may be deployed, without ever being redistributed. Additionally, redistribution may redistribute parts according to any suitable inventory plan.

System 34 may include a computer system 35, a server 36, and a database 37, which may share data storage, communications, or other resources according to particular needs. Computer system 35 may include appropriate input devices, output devices, mass storage media, processors, memory, or other components for receiving, processing, storing, and communicating information according to the operation of system 34. As used in this document, the term "computer" is intended to encompass a personal computer, workstation, network computer, wireless data port, wireless telephone, personal digital assistant, one or more microprocessors within these or other devices, or any other suitable processing device.

Server 36 manages applications that generate optimized inventory deployment and redistribution plans. Server 36 includes one or more software components such as a pre-processing module 38 and a solver 39. Pre-processing module 38 manages input and output operations, and computes a net demand and a replenishment lead-time for each part at each location 22. Pre-processing module 38 computes a demand over lead-time, or lead-time demand, related to a number of parts in a pipeline. Preprocessing module 38 also generates mathematical formulations, which are transmitted to solver 39 for solving.

Pre-processing module 38 may include a deployment module 40 and a redistribution module. Deployment module 40 may be used to generate a coverage function that describes the distribution of parts among locations 22. Solver 39 optimizes the coverage function to determine an optimized distribution of parts. Solver 39 may comprise any suitable mathematical programming solver such as CPLEX by ILOG, INC. Redistribution module may be used to generate a transfer function that describes the cost of transferring parts among locations 22. Solver 39 optimizes the transfer function to determine an optimized manner of redistributing parts. As noted above, deployment may occur independently of redistribution. That is, inventory may be deployed, without ever being redistributed. Additionally, redistribution may redistribute parts according to an inventory plan generated by deployment module 40 or according to any suitable inventory plan.

Database 40 stores data that may be used by server 36. Data may include, for example, the history of the demand for each part at each location 22, the lead-time required to transport a part from one location 22 to another location 22, and the maximum space capacity at location 22. Computing system 35 and database 40 may be coupled to server 36 using one or more local area networks (LANs), metropolitan area networks (MANS), wide area networks (WANs), a global computer network such as the Internet, or any other appropriate wired, optical, wireless, or other links.

Figure 3:
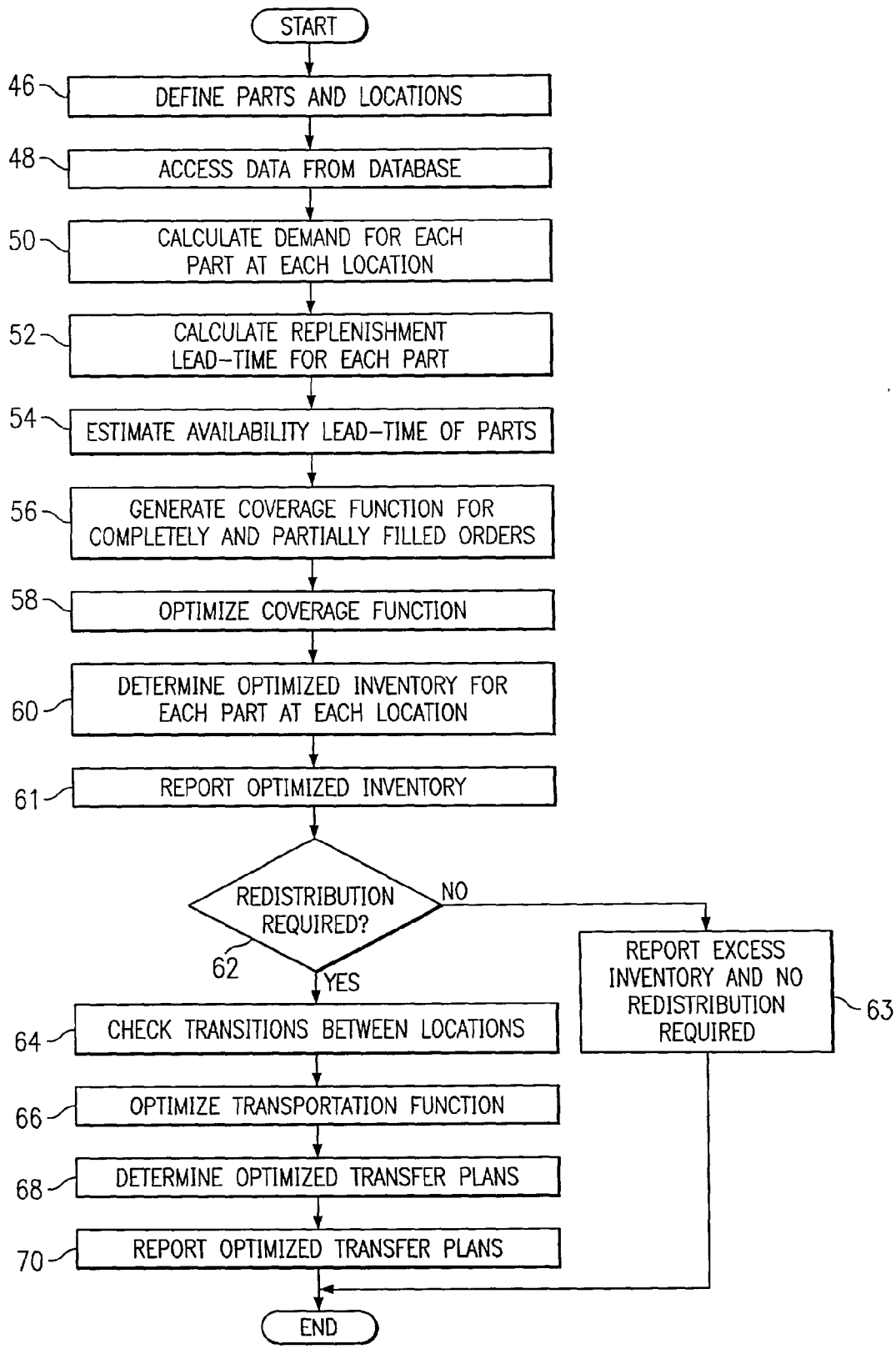
FIG. 3 illustrates an example method for deploying and redistributing inventory of one or more parts among one or more locations.

FIG. 3 illustrates an example method for deploying and redistributing inventory of one or more parts among one or more locations 22. Deployment may occur independently of redistribution. That is, inventory may be deployed, without ever being redistributed. Additionally, redistribution may redistribute parts according to the inventory deployment plan described in connection with FIG. 3, or according to any suitable inventory plan.

Processing module 38 initiates the method at step 46 by defining a number $1, 2, \ldots, i, \ldots, I$ of parts and a number $1, 2, \ldots, j, \ldots, J$ of locations 22. For example, j=1, 2, 3 and 4 and refer to warehouse locations 22a-d, respectively. At step 48, data is accessed from database 37. Data may include, for example, a demand history of each part at each location 22.

The demand history may describe the parts that each location 22 requires. Data may include repair history that may describe the capability of each location 22 to repair a part. Data may include the paths that may be used to transfer parts between locations 22, along with the costs associated with transporting parts along the paths. Data may include the cost of purchasing a part, the cost of storing a part in the location as a percentage of the purchase cost for the part, and a cost associated with ordering a part.

At step 50, a demand for each part at each location 22 is calculated. The demand may include a dependent demand and an independent demand. A dependent demand at location 22 describes the parts that location 22 supplies to other locations 22. An independent demand at location 22 describes parts used at location 22. The demand at location 22 may account for the probability that a part is repaired and placed back into the inventory at location 22. Demand may be calculated by starting at a demand endpoint and ending at a supply endpoint of distribution network 20. A method for calculating a demand for a part at each location 22 is described in more detail with reference to FIG. 4.

A replenishment lead-time for each part at each location 22 is calculated at step 52. The replenishment lead-time for a part at location 22 describes the time required for location 22 to receive the part from another location 22. The replenishment lead-time may be computed by starting at a supply endpoint and ending at a demand endpoint. An availability lead-time for each part at each location 22 is estimated at step 54. The availability lead-time at a location 22 describes a waiting time due to back order at location 22 plus the transfer lead-time from a supplier to location 22 and the replenishment lead-time for the supplier of location 22. A method for estimating the availability lead-time of a part at location 22 is described in more detail with reference to FIG. 5.

A coverage function is determined at step 56. The coverage function describes the expected ability of a location 22 to completely or partially fill an order for a part, and may be determined from the demand, availability lead-time of the part, and inventory level for the part at location 22. The coverage function may be described using the expected backorder of the part at location 22. A method for determining a coverage function is described in more detail with reference to FIG. 6. Solver 39 optimizes the coverage function at step 58. Optimizing the coverage function may be accomplished by minimizing the expected backorder. At step 60, an optimized inventory for each part at each location 22 is determined from the optimized coverage function. At step 61, solver 39 reports the optimized inventory for each part at each location 22. As noted above, deployment may occur independently of redistribution. That is, inventory may be deployed, without ever being redistributed.

At step 62, redistribution module determines whether redistribution is required by calculating an excess and deficit for each part at each location 22 from the actual inventory and the optimal deployment. Redistribution of the inventory may be required if, for example, the actual inventory at each location 22 does not match the optimized inventory calculated for each location 22. As noted above, redistribution may redistribute parts according to the optimized inventory reported at step 61, or according to any suitable inventory plan. If redistribution is not required, deployment module 40 proceeds to step 63 to report any excess inventory and a recommendation to not perform a redistribution of parts. After reporting the result, the method is terminated. If redistribution is required, redistribution module proceeds to step 64 to check the transitions between locations 22. The transitions describe paths that may be used to transfer parts from one location 22 to another location 22.

At step 66, a transfer function describing the transfer of parts between locations 22 is optimized. Minimizing the total costs associated with transporting the parts may optimize the transfer function. A method for determining optimized transfer plans for transferring parts between locations 22 is described in more detail with reference to FIG. 7. At step 70, the optimized transfer plans, the resulting inventory levels, and possible excess in inventory of parts in the network are reported. After reporting the result, the method is terminated.

Figure 4:
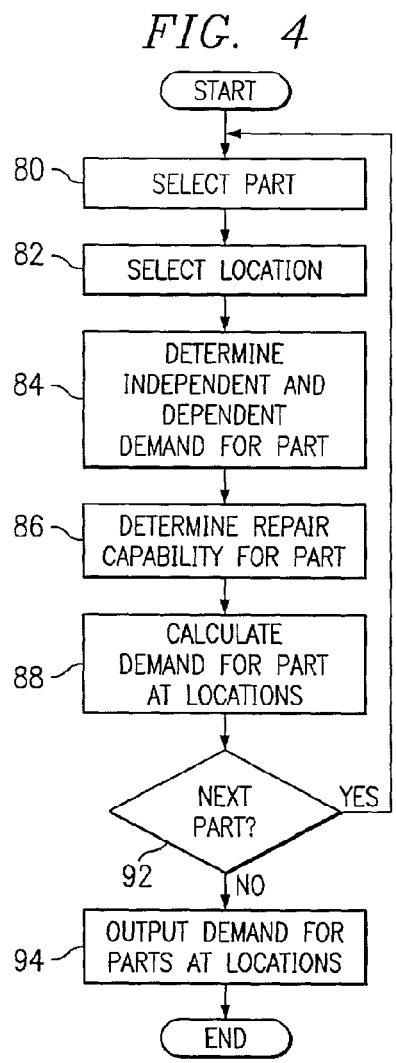
FIG. 4 illustrates an example method for calculating a demand for one or more parts at one or more locations.

FIG. 4 illustrates an example method for calculating a demand for one or more parts at one or more locations 22. Deployment module 40 initiates the method at step 80 by selecting a part i. A location j is selected at step 82. Location j may be selected such that the demand at a demand endpoint is calculated first, and the demand at a supply endpoint is calculated last.

At step 84, an independent and a dependent demand for part i at location j is determined. The independent demand for part i at location j may be represented by $\lambda'_{ij}$. The dependent demand for part i at location j may be represented $\lambda_{ik}$, where k is a demand end point for location j. At step 86, the repair capability $r_{ij}$ for part i at location j is determined. The repair capability $r_{ij}$ may be determined from the proportion of demand for part i at location j that is repairable at location j. Demand is calculated at step 88. Starting with demand end points j, demand $\lambda_{ij}$ for part i is equal to its independent demand. For any location j that is not a demand end point, the demand $\lambda_{ij}$ for part i may be calculated using Equation (1):

$$\lambda_{ij} + \lambda'_{ij} + \sum_{k \text{ is a demand point for } j} (1 - r_{ik})\lambda_{ik} \qquad (1)$$

At step 92, deployment module 40 determines whether there is a next part for which a demand is to be determined. If there is a next part, deployment module 40 returns to step 80 to select the next part. If there is no next part, deployment module 40 proceeds to step 94 to output the calculated demand for each part at each location. After outputting the demand, the method is terminated.

Figure 5:
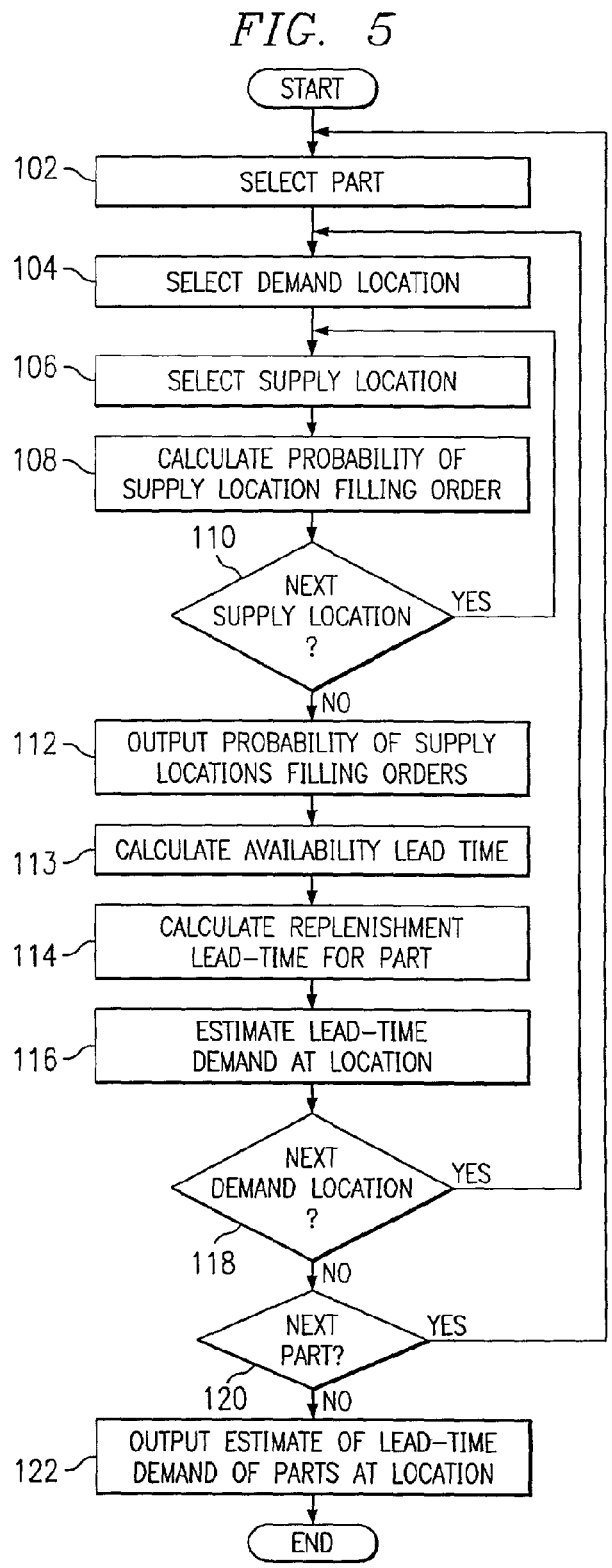
FIG. 5 illustrates an example method for estimating the availability of one or more parts at one or more locations.

FIG. 5 illustrates an example method for estimating the availability lead-time of one or more parts at one or more locations 22. Deployment module 40 initiates the method at step 102 by selecting a part i. A demand location j is selected at step 104, and a supply location $l_k$ is selected at step 106. The supply location $l_k$ may be selected from a prioritized list of n of supply locations $l_1, \ldots, l_n$. For each supply location $l_k$, the list may describe a proportion $C_{ilkj}$ of a demand for part i at demand location j that is scheduled to be satisfied by supply location $l_k$, a probability $\alpha_{ilkj}$ that part i is filled at supply location $l_k$ for demand location j, and a lead-time $T_{ilkj}$ for a part i to flow from supply location $l_k$ to demand location j. Demand location j and supply location $l_k$ may be selected such that the availability lead-time at a supply endpoint is calculated first, and the availability lead-time at a demand endpoint is calculated last.

At step 108, a probability $P_{ilkj}$ of a supply location $l_k$ filling an order for part i placed by a demand location j, given that the order is not filled by another supply location, is calculated. The probability $P_{illj}$ for supply location $l_l$ may be computed using Equation (2):

$$P_{illj} = \alpha_{illj} C_{illj} \qquad (2)$$

At step 110, deployment module 40 determines whether there is a next supply location $l_k$. If there is a next supply location, deployment module 40 returns to step 106 to select the next supply location. The probability $P_{il_kj}$ of the next supply location $l_k$ filling an order for part i placed by demand location j, given that the order is not filled by another supply location, may be computed at step 108 using the process described by recursive Equations (3):

$$P_{il_kj} = \alpha_{il_kj} C'_{l_kj}$$

where $$C'_{il_1j} = C_{il_1j}$$

$$C'_{il_kj} = C_{il_kj} + (1-\alpha_{il_{k-1}j})C_{il_{k-1}j} \text{ for } k>1 \quad (3)$$

If there is no next supply location at step 110, deployment module 40 proceeds to step 112 to output the probabilities of the supply locations $l_k$ fulfilling an order placed by demand location j.

At step 113, an availability lead-time $T_{ij}$ for each location j is calculated. Availability lead-time $T_{ij}$ may be calculated according to recursive Equation (4):

$$T_{ij} = \sum_{k=1}^{n} \left( T_{il_kj} + \frac{EBO_{il_k}(S_{il_k})}{\lambda_{il_k}} T_{il_k} \right) P_{il_kj} \quad (4)$$

The expected number of completely backordered demand $B_c$ may be described by Equation (5):

$$EBO_c = \chi \sum_{x=S_{ij}}^{\infty} xP(X \mid \mu_{ij}) \quad (5)$$

where $P(X|\mu_{ij}) = e^{-\mu_{ij}} \mu_{ij}^x/x!$ is the Poisson probability mass function for the distribution of demand with mean $\mu_{ij}$, $\mu_{ik}$ represents the mean number of parts i in the pipeline at supply location k. The expected number of partially backordered demand $B_p$ for part i at location j may be described by Equation (6):

$$EBO_p = (1-\chi) \sum_{x=S_{ij}}^{\infty} (x-S_{ij})P(X \mid \mu_{ij}) \quad (6)$$

The expected number of backorders EBO ($S_{ij}$) having the stock level $S_{ij}$ of part i at location j may be defined using Equation (7):

$$EBO(S_{ij}) = \chi \sum_{x=S_{ij}}^{\infty} xP(X \mid \mu_{ij}) + (1-\chi) \sum_{x=S_{ij}}^{\infty} (x-S_{ij})P(X \mid \mu_{ij}) \quad (7)$$

$$= \sum_{x=S_{ij}}^{\infty} (x - \chi S_{ij})P(X \mid \mu_{ij}).$$

At step 114, the replenishment lead-time $\Theta_{ij}$ for part i at demand location j is calculated. The replenishment lead-time $\Theta_{ij}$ for for part i at location j may be calculated using Equation (8):

$$\Theta_{ij} = r_{ij}\tau_{ij} + (1-r_{ij})T_{ij} \quad (8)$$

where $\tau_{ij}$ represents the repair lead-time for part i at demand location j. The lead-time demand $\mu_{ij}$ of a part i at demand location j is estimated at step 116. The lead-time demand is related to a number of parts in a pipeline. The lead-time demand may be estimated using Equation (9):

$$\mu_{ij} = \lambda_{ij}\Theta_{ij} \quad (9)$$

At step 118, deployment module 40 determines whether there is a next demand location. If there is a next demand location, deployment module 40 returns to step 104 to select the next demand location. If there is no next demand location, deployment module 40 proceeds to step 120 to determine whether there is a next part. If there is a next part, deployment module 40 returns to step 102 to select the next part. If there is no next part, deployment module 40 proceeds to step 122 to report the lead-time demand of each part at each location 22. After reporting the lead-time demand, the method is terminated.

Figure 6:
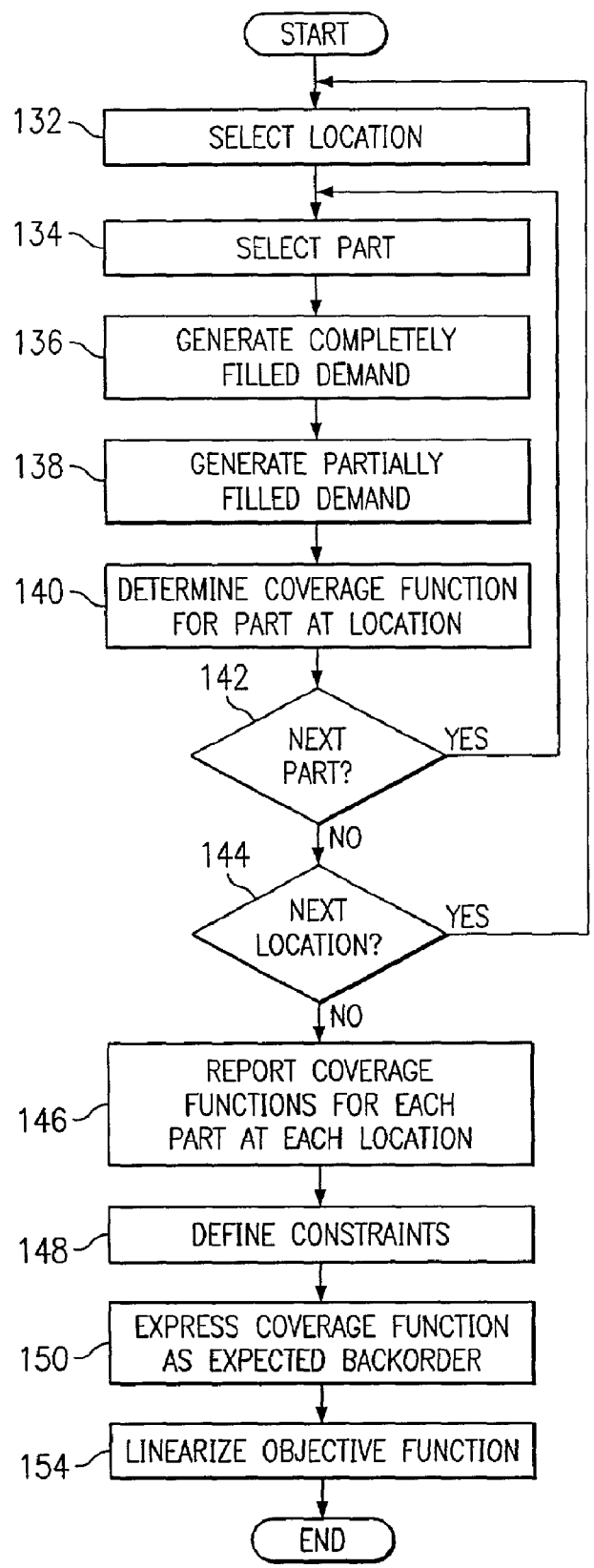
FIG. 6 illustrates an example method for generating a coverage function for one or more parts at one or more locations.

FIG. 6 illustrates an example method for generating a coverage function for one or more parts at one or more locations 22. Deployment module 40 initiates the method at step 132 by selecting a location j. A part i is selected at step 134.

At step 136, a completely filled demand $D_c$ for part i at location j is calculated at step 136. A completely filled demand $D_c$ may be described by Equation (10):

$$D_c = \sum_{x=0}^{S_{ij}-1} xP(X \mid \mu_{ij}) \quad (10)$$

where $P(X|\mu_{ij}) = e^{-\mu_{ij}}\mu_{ij}^x/x!$ is the Poisson probability mass function for the distribution of demand with mean $\mu_{ij}$. A partially filled demand $D_p$ for part i at location j is calculated at step 138. The partially filled $D_p$ demand may be described by Equation (11):

$$D_p = \chi(S_{ij} - 1)\left[1 - \sum_{x=0}^{S-1} P(X \mid \mu_{ij})\right] \quad (11)$$

where x is the percentage of partial fill allowed for a part. At step 140, a coverage function for part i at location j is determined. The coverage function for part i at location j describes the expected proportion filled demand for part i of location j, and may be expressed using Equation (12):

$$\left\{ \sum_{x=0}^{S_{ij}} xP(X \mid \mu_{ij}) + \chi \sum_{x=S}^{\infty} (S_{ij}-1)P(X \mid \mu_{ij}) \right\} / \mu_{ij} = \left\{ \sum_{x=0}^{S_{ij}} (x - \chi(S_{ij}-1)) \atop P(X \mid \mu_{ij}) + \chi(S_{ij}-1) \right\} / \mu_{ij} \quad (12)$$

At step 142, deployment module 40 determines whether there is a next part. If there is a next part, deployment module 40 returns to step 134 to select the next part. If there is no next part, deployment module 40 proceeds to step 144 to determine whether there is a next location. If there is a next location, deployment module 40 returns to step 132 to select the next location. If there is no next location, deployment module 40 proceeds to step 146 to determine the coverage function for the number of parts at the number of locations. The coverage function may be expressed as the weighted average of coverage for the parts at locations. The coverage function for the parts at the locations may be expressed by Expression (13):

$$\sum_{j=1}^{J}\left\{\sum_{i=1}^{I}\beta_i\sum_{x=0}^{S_{ij}}[x-\chi S_{ij}]P(X\mid\mu_{ij})+\chi S_{ij}\right\}\bigg/\sum_{i=1}^{I}\mu_{ij} \quad (13)$$

where $\beta_i$ represents a weight of part i, which may be based on an importance measure of part i. At step 148, constraints for the coverage function may be defined. Constraints may include, for example, the following:

a. The weighted average of coverage for the parts at each location j is greater than or equal to the coverage target $\omega_j$ at location j, which may be expressed by Expression (13a):

$$\left[\sum_{i=1}^{I}\left\{\sum_{x=0}^{S_{ij}}[x-\chi S_{ij}]P(X\mid\mu_{ij})+\chi S_{ij}\right\}\right]\bigg/\sum_{i=1}^{I}\mu_{ij} \geq \omega_j, \forall j \quad (13a)$$

b. The coverage for each part i at each location j is greater than or equal to the coverage target for part i at location j, which may be expressed by Expression (13b):

$$\sum_{x=0}^{S_{ij}}[x-\chi S_{ij}]P(X\mid\mu_{ij})+\chi S_{ij} \geq \alpha_j\mu_{ij}, \forall i, \forall j \quad (13b)$$

c. The number of new purchases for a part i, $X_{ij}$ at location j, which may be expressed by Expression (13c):

$$X_{ij}=[S_{ij}+\gamma_i\lambda_{ij}-Y_{ij}]^+, \forall i, \forall j \quad (13c)$$

where $\gamma_i$ represents a proportion of a demand for a failed part i, and $(x)^+ = \max(0,x)$.

d. The inventory investment at each location j is less than or equal to the inventory investment limit $Inv_j$ for location j, which may be expressed by Expression (13d):

$$\sum_{i=1}^{I}C_i(S_{ij}+\gamma_i\lambda_{ij}-Y_{ij}) \leq Inv_j, \forall j \quad (13d)$$

where $C_i$ represents a purchase price for part i, and $Y_{ij}$ represents an on-hand inventory for part i at location j.

e. The overall inventory investment is less than or equal to an overall inventory investment limit Inv, which may be expressed by Expression (13e):

$$\sum_{i=1}^{I}C_iX_{ij} \leq Inv \quad (13e)$$

f. The overall inventory cost is less than or equal to overall budget B, which may be expressed by Expression (13f):

$$\sum_{j=1}^{J}\left\{\sum_{i=1}^{I}[h_{ij}(S_{ij}-\mu_{ij}+EBO_{ij})+k_i\lambda_{ij}]\right\}+\sum_{j}^{}\sum_{i=1}^{I}C_ix_{ij} \leq B \quad (13f)$$

where $h_{ij}$ represents a holding cost per unit of part i at location j, and $k_i$ represents an order cost for part i.

g. The cost at each location j is less than or equal to a budget $B_j$ at location j, which may be expressed by Expression (13g):

$$\sum_{i=1}^{I}\left[\begin{array}{c}h_{ij}(S_{ij}-\mu_{ij}+EBO_{ij})+\\ k_i\lambda_{ij}+C_i(S_{ij}+\gamma_i\lambda_{ij}-Y_{ij})^+\end{array}\right] \leq B_j, \forall j \quad (13g)$$

h. The total volume occupied by parts at each location j is less than or equal to the volume capacity limit $V_j$ at location j, which may be expressed by Expression (13h):

$$\sum_{i=1}^{I}v_iS_{ij} \leq V_j, \forall j \quad (13h)$$

i. The stock levels $S_{ij}$ are integers, which may be expressed by Expression (13i):

$$S_{ij} \text{ are integers} \quad (13i)$$

At step 150, the coverage function is converted to a backorder function that corresponds to expected backorders, and the constraints are expressed in terms of backorders. Using the backorder function may provide for a simpler optimization process. The backorder function may be Expression (14):

$$\sum_{j=1}^{J}\sum_{i=1}^{I}EBO_{ij}(S_{ij}) \quad (14)$$

Minimizing the backorder function is equivalent to maximizing the coverage function. The constraints may be expressed by Expressions (14a):

$$S_{ij} \geq S_{ij}^M, \forall i, \forall j \quad (14a)$$

$$\sum_{i=1}^{I}EBO_{ij}(S_{ij}) \leq (1-\varpi_j)\sum_{i=1}^{I}\mu_{ij}, \forall j$$

$$X_{ij} \geq S_{ij}+\lceil\gamma_i\lambda_{ij}-Y_{ij}\rceil, \forall i$$

$$\sum_{j=1}^{J}\left\{\sum_{i=1}^{I}\left[h_{ij}\left(\begin{array}{c}S_{ij}-\mu_{ij}+\\ EBO_{ij}\\ k_i\lambda_{ij}\end{array}\right)+\right]\right\}+\sum_{j=1}^{J}\sum_{i=1}^{I}C_ix_{ij} \leq B$$

$$\sum_{i=1}^{I}\left[\begin{array}{c}h_{ij}(S_{ij}-\mu_{ij}+EBO_{ij})+\\ k_i\lambda_{ij}+C_i(S_{ij}+\gamma_i\lambda_{ij}-Y_{ij})\end{array}\right] \leq B_j, \forall j$$

$$\sum_{i=1}^{I_1}v_iS_{ij} \leq V_j, \forall j$$

$S_{ij}$ are integers where $S_{ij}^M$ represents the minimum stock level that guarantees the minimum target coverage. The high degree of non-linearity of the constraints may be reduced by replacing the minimum target coverage constraint for each part at each location expressed by Expression (14a) with an equivalent constraint expressed as $S_{ij} \geq S_{ij}^M, \forall i, \forall j$. The definition of the number of new purchases expressed by Expression (14b) may be replaced with a relaxed constraint expressed as $X_{ij} \geq S_{ij}+\lceil\gamma_i\lambda_{ij}-Y_{ij}\rceil, \forall i$.

Maximization of the coverage function may be shown to be equivalent to minimizing the backorder function. The weighted average of coverage for distribution network 20 may be expressed by Expression (14b):

$$\sum_{j=1}^{J}\sum_{i=1}^{I}\beta_{ij}\theta_{ij}(S_{ij}) \tag{14b}$$

where $\theta_{ij}(S_{ij})$ represents the coverage for part i at location j defined by Equation (14c):

$$\theta_{ij}(S_{ij}) = \left\{\sum_{x=0}^{S_{ij}} xP(X\mid\mu_{ij}) + \chi\sum_{x=S_{ij}+1}^{\infty} S_{ij}P(X\mid\mu_{ij})\right\}\bigg/\mu_{ij} \tag{14c}$$

The backorder function describes the total expected number of backorders for distribution network 20 and may be expressed by Expression (14d):

$$\sum_{j=1}^{J}\sum_{i=1}^{I} EBO_{ij}(S_{ij}) \tag{14d}$$

The following proposition may be established:
Proposition 1: Vector $S_j = (S_{ij}, \ldots, S_{Ij})$ satisfies the performance constraint expressed by Expression (14e):

$$\sum_{i=1}^{I}\mu_{ij}\theta_{ij}(S_{ij}) \geq \omega_j \sum_{i=1}^{j}\mu_{ij} \tag{14e}$$

if and only if vector $S_j$ satisfies an expected backorders constraint expressed by Expression (14f):

$$\sum_{i=1}^{I} EBO_{ij}(S_{ij}) \leq (1-\omega_j)\sum_{i=1}^{I}\mu_{ij} \tag{14f}$$

A relationship between expected backorder $EBO_{ij}(S_{ij})$ and performance $\theta_{ij}(S_{ij})$ may be established according to Equations (14g):

$$\theta_{ij}(S_{ij}) = \left\{\mu_{ij} - \sum_{x=S_{ij}+1}^{\infty} xP(X\mid\mu_{ij}) + \chi\sum_{x=S_{ij}+1}^{\infty} S_{ij}P(X\mid\mu_{ij})\right\}\bigg/\mu_{ij} \tag{14g}$$

$$\theta_{ij}(S_{ij}) = \left\{\mu_{ij} - \sum_{x=S_{ij}+1}^{\infty} (x-\chi S_{ij})P(X\mid\mu_{ij})\right\}\bigg/\mu_{ij}$$

$$\theta_{ij}(S_{ij}) = \{\mu_{ij} - EBO_{ij}(S_{ij})\}/\mu_{ij}$$

$$= 1 - \{EBO_{ij}(S_{ij})\}/\mu_{ij}$$

$$EBO_{ij}(S_{ij}) = \mu_{ij}[1-\theta_{ij}(S_{ij})]$$

For any set of $S_{ij}$ that satisfies the performance constraint expressed by Expression (14f), the following Expressions (14h) may be shown:

$$\sum_{i=1}^{I} EBO_{ij}(S_{ij}) \leq (1-\omega_j)\sum_{i=1}^{I}\mu_{ij} \tag{14h}$$

$$\sum_{i=1}^{I}\mu_{ij}[1-\theta_{ij}(S_{ij})] \leq [1-\omega_j]\sum_{i=1}^{I}\mu_{ij}$$

$$\sum_{i=1}^{I}\mu_{ij} - \sum_{i=1}^{I}\mu_{ij}\theta_{ij}(S_{ij}) \leq$$

$$\sum_{i=1}^{I}\mu_{ij} - \omega_j\sum_{i=1}^{I}\mu_{ij} - \sum_{i=1}^{I}\mu_{ij}\theta_{ij}(S_{ij}) \leq -\omega_j\sum_{i=1}^{I}\mu_{ij}$$

$$\sum_{i=1}^{I}\mu_{ij}\theta_{ij}(S_{ij}) \geq \omega_j\sum_{i=1}^{I}\mu_{ij}$$

The stock level $S_{ij}$ in question satisfies the location performance constraint expressed by Equations (14g). The steps may be reversed to prove the converse.

The following proposition describing the relationship between performance and coverage may be established:
Proposition: Maximizing system-wide coverage is equivalent to minimizing the total system-wide backorders.

The proposition may be established according to Equations (14i):

Maximize (14i)

$$\sum_{j=1}^{J}\sum_{i=1}^{I}\mu_{ij}\theta_{ij}(S_{ij}) = \sum_{j=1}^{J}\sum_{i=1}^{I} 1 - EBO_{ij}(S_{ij})$$

$$= 1 - \sum_{j=1}^{J}\sum_{i=1}^{I} EBO_{ij}(S_{ij})$$

$$= -\left[\sum_{j=1}^{J}\sum_{i=1}^{I} EBO_{ij}(S_{ij})\right] - 1$$

$$\text{Maximize} - \left[\sum_{j=1}^{J}\sum_{i=1}^{I} EBO_{ij}(S_{ij})\right] - 1 \equiv \text{Maximize}\sum_{j=1}^{J}\sum_{i=1}^{I} EBO_{ij}(S_{ij})$$

At step 154, the objective function that measures expected backorder as expressed by Expression (13) may be linearized. To linearize the objective function and constraints, the non-linear terms of the objective function and constraints may be approximated by linear terms. The non-linear terms are discrete and convex, so a first-order linear approximation using the finite difference for two neighboring discontinuous points may be used to approximate each non-linear term. Each non-linear term in the objective function and the constraints is replaced with a continuous variable $t_{ij}$ and a linearization constraint that describes the under estimation at points of discontinuity is added to the constraints.

The linearized objective function may be expressed by Expression (15):

$$\sum_{j=1}^{J}\sum_{i=1}^{I} t_v \tag{15}$$

The linearization constraint may be expressed by Expression (16):

$$t_{ij} \geq m_{ij}(X-X_{ij})+b_{ij}, \forall S_{ij} < X_{ij} \leq S_{upper}, \forall i,j \quad (16)$$

where $m_{ij}=P(X>X_{ij}|\mu_{ij})$, $b_{ij}=P(X>X_{ij}|\mu_{ij})(X-X_{ij})+EBO_{ij}(X_{ij}+1)$, and $S_{upper}$ is the upper bound on the inventory for part i at location j. Other constraints may be expressed by Expressions (16a):

$$S_{ij} \geq S_{ij}^M, \forall i = 1, \ldots I_1, \forall j \quad (16a)$$

$$\left[ \sum_{i=1}^{I} \sum_{x=0}^{S_{ij}} [x - \chi S_{ij}] \middle/ \sum_{i=1}^{I} \mu_{ij} \geq \omega_j, \forall j \right.$$
$$\left. P(X|\mu_{ij}) + \chi S_{ij} \right]$$

$$X_{ij} \geq \sum_{j=1}^{J} S_{ij} + \gamma_i \lambda_{ij} - Y_{ij}, \forall i = 1, \ldots, I$$

$$\sum_{j=1}^{J} \sum_{i=1}^{I} [h_{ij}(S_{ij} - \mu_{ij} + t_{ij}) + k_i \lambda_{ij} + C_i x_{ij}] \leq B$$

$$\sum_{i=1}^{I} [h_{ij}(S_{ij} - \mu_{ij} + t_{ij}) + k_i \lambda_{ij}] \leq B_j, \forall j$$

$$\sum_{j=1}^{J} \sum_{i=1}^{I} C_i(S_{ij} + \gamma_i \lambda_{ij} - Y_{ij}) \leq Inv$$

$$\sum_{i=1}^{I_1} C_i(S_{ij} + \gamma_i \lambda_{ij} - Y_{ij}) \leq Inv_j, \forall j$$

$$\sum_{i=1}^{I_1} v_i S_{ij} \leq V_j, \forall j$$

$$S_{ij} \text{ are integers}, \forall i = 1, \ldots, I_2, \forall j$$

After linearizing, deployment module 40 solves the resulting mixed integer-programming problem and determines the optimal stock levels for each part at each location.

An objective function measuring the system-wide total cost may also be defined at step 154. The total cost function may be expressed by Expression (16b):

$$\sum_{j=1}^{J} \sum_{i=1}^{I} [h_{ij}(S_{ij} - \mu_{ij} + EBO_{ij}) + k_i \lambda_{ij} + C_i x_{ij}] \quad (16b)$$

The constraints for the total cost function may be expressed by Expressions (16c):

$$S_{ij} \geq S_{ij}^M, \forall i = 1, \Lambda I, \forall j \quad (16c)$$

$$\left[ \sum_{i=1}^{I} \left\{ \sum_{x=0}^{S_{ij}} [x - \chi S_{ij}] \middle/ \sum_{i=1}^{I} \mu_{ij} \geq \omega_j, \forall j \right. \right.$$
$$\left. \left. P(X|\mu_{ijt}) + \chi S_{ij} \right\} \right]$$

$$X_{ij} \geq S_{ij} + \lceil \gamma_i \lambda_{ij} - Y_{ij} \rceil, \forall i = 1, \ldots, I$$

$$\sum_{i=1}^{I} v_i S_{ij} \leq V_j, \forall j$$

$$S_{ij} \text{ are integers}, \forall i = 1, \ldots, I, \forall j$$

The total cost function and the constraints may also be linearized at step 154 in order to allow the objective function to be optimized by solver 39. The total cost objective function, as expressed by Expression (16b), may be linearized according to Expression (16d):

$$\sum_{j=1}^{J} \sum_{i=1}^{I} [h_{ij}(S_{ij} - \mu_{ij} + t_{ij}) + k_i \lambda_{ij} + C_i x_{ij}] \quad (16d)$$

The constraints may be linearized according to Expressions (16e):

$$t_{ij} \geq m_{ij}(S - X_{ij}) + b_{ij}, \forall S_{ij}^M < X_j \leq S_{upper}, \forall ij \quad (16e)$$

$$S_{ij} \geq S_{ij}^M, \forall i = 1, \Lambda I_1, \forall j$$

$$\sum_{i=1}^{I} t_{ij} \geq (1 - \omega_j) \sum_{i=1}^{I} \mu_{ij}, \forall j$$

$$X_{ij} \geq S_{ij} + \lceil \gamma_i \lambda_{ij} - Y_{ij} \rceil, \forall i = 1, \ldots, I$$

$$\sum_{i=1}^{I_i} v_i S_{ij} \leq V_j, \forall j$$

$$S_{ij} \text{ are integers}, \forall i = 1, \ldots, I_2, \forall j$$

After linearizing, deployment module 40 solves the resulting mixed integer-programming problem and determines the optimal stock levels for each part at each location.

Although an example of the invention and its advantages are described in detail, a person skilled in the art could make various alterations, additions, and omissions without departing from the spirit and scope of the present invention as defined by the appended claims.

What is claimed is:

1. A computer-implemented system deploying parts in a distribution network, the system comprising:
   a computer coupled with one or more databases, the computer configured to:
   access data associated with a plurality of parts at a plurality of locations in the distribution network;
   calculate a demand for each part at each location;
   estimate an availability lead-time for each part at each location; and
   generate a coverage function for each location based on the availability lead-time and the accessed data for each part.

2. The system of claim 1, wherein the coverage function is optimized by minimizing an expected backorder for at least one of the plurality of parts at each location.

3. The system of claim 1, wherein the computer is further configured to:
   optimize the coverage function; and
   determine an optimal deployment of the parts at each location according to the optimized coverage function.

4. The system of claim 1, wherein the computer is further configured to calculate a replenishment lead-time for each part at each location.

5. The system of claim 1, wherein the accessed data comprises data associated with a demand history, the demand history describes parts required at each location.

6. The system of claim 1, wherein the accessed data comprises data associated with a repair history, the repair history describes the capability of each location to repair a part.

7. The system of claim 1, wherein the accessed data comprises data associated with one or more paths used to transfer parts between locations.

8. The system of claim 1, wherein the accessed data comprises data selected from the group consisting of:
a cost of transporting parts along one or more paths;
a cost of purchasing one or more parts;
a cost of storing one or more parts at each location as a percentage of the purchase cost for the one or more parts; and
a cost associated with ordering one or more parts.

9. A computer-implemented method for deploying parts in a distribution network, comprising:
accessing, by a computer, data associated with a plurality of parts at a plurality of locations in the distribution network;
calculating, by the computer, a demand for each part at each location;
estimating, by the computer, an availability lead-time for each part at each location; and
generating, by the computer, a coverage function for each location based on the availability lead-time and the accessed data for each part.

10. The method of claim 9, wherein the coverage function is optimized by minimizing an expected backorder for at least one of the plurality of parts at each location.

11. The method of claim 9, further comprising:
optimizing the coverage function; and
determining an optimal deployment of the parts at each location according to the optimized coverage function.

12. The method of claim 9, further comprising calculating a replenishment lead-time for each part at each location.

13. The method of claim 9, wherein the accessed data comprises data associated with a demand history, the demand history describes parts required at each location.

14. The method of claim 9, wherein the accessed data comprises data associated with a repair history, the repair history describes the capability of each location to repair a part.

15. The method of claim 9, wherein the accessed data comprises data associated with one or more paths used to transfer parts between locations.

16. The method of claim 9, wherein the accessed data comprises data selected from the group consisting of:
a cost of transporting parts along one or more paths;
a cost of purchasing one or more parts;
a cost of storing one or more parts at each location as a percentage of the purchase cost for the one or more parts; and
a cost associated with ordering one or more parts.

17. A computer-readable storage medium embodied with software of deploying parts in a distribution network, the software when executed using one or more computers is configured to:
access data associated with a plurality of parts at a plurality of locations in the distribution network;
calculate a demand for each part at each location;
estimate an availability lead-time for each part at each location; and
generate a coverage function for each location network based on the availability lead-time and the accessed data for each part.

18. The computer-readable storage medium of claim 17, wherein the coverage function is optimized by minimizing an expected backorder for at least one of the plurality of parts at each location.

19. The computer-readable storage medium of claim 17, further configured to:
optimize the coverage function; and
determine an optimal deployment of the parts at each location according to the optimized coverage function.

20. The computer-readable storage medium of claim 17, further configured to calculate a replenishment lead-time for each part at each location.

21. The computer-readable storage medium of claim 17, wherein the accessed data comprises data associated with a demand history, the demand history describes parts required at each location.

22. The computer-readable storage medium of claim 17, wherein the accessed data comprises data associated with a repair history, the repair history describes the capability of each location to repair a part.

23. The computer-readable storage medium of claim 17, wherein the accessed data comprises data associated with one or more paths used to transfer parts between locations.

24. The computer-readable storage medium of claim 17, wherein the accessed data comprises data selected from the group consisting of:
a cost of transporting parts along one or more paths;
a cost of purchasing one or more parts;
a cost of storing one or more parts at each location as a percentage of the purchase cost for the one or more parts; and
a cost associated with ordering one or more parts.

* * * * *